(12) United States Patent
Takatsugi et al.

(10) Patent No.: US 6,382,948 B1
(45) Date of Patent: May 7, 2002

(54) TEMPERATURE CONTROL DEVICE FOR A PROXIMAL PORTION OF A HEATING CYLINDER OF AN INJECTION MOLDING MACHINE

(75) Inventors: Satoshi Takatsugi; Wataru Shiraishi; Toshio Ishiguro, all of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/528,715

(22) Filed: Mar. 20, 2000

(30) Foreign Application Priority Data

Apr. 13, 1999 (JP) .......................................... 11-105763

(51) Int. Cl.[7] .............................................. B29C 45/78
(52) U.S. Cl. ...................... 425/143; 425/144; 425/378.1
(58) Field of Search ........................ 425/174.8 R, 378.1, 425/143, 144

(56) References Cited

U.S. PATENT DOCUMENTS

| | | | |
|---|---|---|---|
| 3,129,459 A | * | 4/1964 | Kullgren et al. ...... 425/174.8 R |
| 3,727,678 A | * | 4/1973 | Schott, Jr. ................. 425/378.1 |
| 5,055,025 A | * | 10/1991 | Muller ........................ 425/144 |
| 5,486,105 A | * | 1/1996 | Katsumata ................... 425/143 |
| 5,551,857 A | * | 9/1996 | Fujioka et al. ............... 425/143 |
| 5,772,933 A | * | 6/1998 | Kotzab ........................ 425/144 |

FOREIGN PATENT DOCUMENTS

| | | |
|---|---|---|
| GB | 1599276 | 9/1981 |
| JP | 61235120 | 10/1986 |
| JP | 01110119 | 4/1989 |
| JP | 07232361 | 9/1995 |
| JP | 08238657 | 9/1996 |
| JP | 10119051 | 5/1998 |

* cited by examiner

*Primary Examiner*—Tim Heitbrink
(74) *Attorney, Agent, or Firm*—Staas & Halsey LLP

(57) ABSTRACT

A temperature control device for a proximal portion of a heating cylinder of an injection molding machine capable of performing check and control of a flow rate of a heat medium easily, improving maintainability and also reducing a manufacturing cost. At least one pair of through holes for flowing the heat medium for temperature control are formed in a jacket to be attached to a proximal portion of a heating cylinder of an injection molding machine. In a passage by pipes connecting the through holes and forming the passage with the through holes, a flow-rate control mechanism and a flow-rate detection mechanism for the heat medium flowing in the passage are arranged. The heat medium is supplied to the passage to control temperature of the proximal portion of the heating cylinder. The flow-rate control and detection mechanisms are arranged on the same side as an operation panel of the injection molding machine, whereby an operator can check and control the flow rate of the medium at the same location where an ordinary operation of the injection molding machine is performed.

5 Claims, 7 Drawing Sheets

TEMPERATURE CONTROL DEVICE FOR A PROXIMAL PORTION OF A HEATING CYLINDER OF AN INJECTION MOLDING MACHINE

BACKGROUND OF THE INVENTION

1. Field of the Invention

The present invention relates to a device for controlling temperature of a proximal portion of a heating cylinder of an injection molding machine.

2. Description of Related Art

An injection molding machine has a mold clamping mechanism, an injection mechanism and an operation panel, all arranged on a frame, and performs injection molding by clamping a mold between stationary and movable plates constituting the mold clamping mechanism, sliding the injection mechanism to press a nozzle at a distal end of a heating cylinder into a center hole of the stationary plate, and injecting molten resin from the nozzle to be molded in a cavity defined in mold halves.

The temperature of an injection screw in the injection molding machine affects the conveyance of the resin in a metering process as well as the hysteresis of the resin. In order to properly convey the resin in the metering process, therefore, the temperature of the injection screw needs to be controlled such that the resin is prevented from adhering to the outer peripheral surface of the injection screw, and that resin introduced from a hopper is melted at the nozzle side, and not at a lower portion of the hopper. For such temperature control, a temperature control device is provided for controlling the temperature of the proximal portion of the heating cylinder.

The temperature control device is designed to control the temperature of the proximal portion of the heating cylinder by simply allowing a temperature control medium to flow downward. The flow rate of the temperature control medium is, conventionally, not controlled at all or is controlled by means of a main tap or a manual flow control valve arranged in the middle of the medium line.

If the flow rate of the temperature control medium is not controlled at all, the temperature of the proximal portion of the heating cylinder becomes unstable and the plasticizing ability of the resin lowers due to excessive removal of heat from the resin, giving rise to a problem that many defective articles are produced because of uneven molding conditions.

Also, even in the case where the temperature control is performed by means of a manual flow control valve, the operation for such temperature control is troublesome because the flow control valve is located on the side of the injection molding machine opposite the operation panel or at a distance from the injection molding machine, and thus a problem arises in that the operator is forced to work in a small dangerous place such as at the back of the machine.

In view of the above problem of low operation efficiency, a method has been proposed in which the control valve is arranged near the operation panel (e.g., in Examined Japanese Utility-Model Publication No. 7-27148). In factories, however, a main tap of the medium is usually fixed in position and it is necessary that piping be installed between the injection molding machine and the main tap. Accordingly, the degree of freedom in installing the piping is low, and in addition, the cost increases because of the use of parts for fixing the piping Ad the flow control valve, and also because of work associated therewith.

Also, a mechanism for preventing the plasticizing ability of resin from being lowered due to excessive removal of heat from the resin has been proposed, in which the temperature control device for controlling the temperature of the proximal portion of the heating cylinder has a two-upper/lower-piece structure (e.g., Unexamined Japanese Patent Publication No. 7-232361). FIG. 11 is a diagram illustrating such a device with the two-upper/lower-piece structure. In FIG. 11, a temperature control device 100 for controlling the temperature of the proximal portion of the heating cylinder comprises two, upper and lower separate jackets 101 and 102, and a proximal portion 106 of the heating cylinder having an injection screw 104 inside is fixed in position between the jackets 101 and 102. One of the jackets, that is, a jacket 101 has a communication port 105 formed therethrough for introducing resin.

A portion of this device disposed in contact with the heating cylinder proximal portion has a semicylindrical surface and thus is difficult to machine with high accuracy. Even if the temperature control device is fixed by bolts or the like, it is still associated with a problem that the efficiency of heat transfer and thus the temperature controllability are low because of a small area of contact between the heating cylinder proximal portion and the temperature control device. Also, since the contact area between the proximal portion of the heating cylinder and the temperature control device varies depending upon a skill of a person who installs the temperature control device, molding conditions vary from machine to machine, and in addition, temperature distribution is liable to become uneven between the upper and lower pieces of the temperature control device, which exerts adverse effects on the molding conditions.

An electromagnetic valve may be used to control the flow rate of the temperature control medium. In this case, however, a controller and a temperature sensor are required in addition to the electromagnetic valve, and thus a problem of high cost arises despite the advantage of high-accuracy temperature controllability.

Further, in order to prevent excessive temperature change from being caused by the downflow of a large quantity of the temperature control medium in a short time, a passage through which the temperature control medium flows may be reduced in diameter. In this case, however, impurities contained in industrial water adhere to the inner surface of the passage, and therefore, frequent maintenance is required to eliminate clogging of the passage with waste, rust, water scale, etc.

FIG. 12 is a sectional view illustrating the arrangement of another conventional device for controlling the temperature of the proximal portion of the heating cylinder. In FIG. 12, a temperature control device 110 comprises a jacket 111 having a hole 112 into which the proximal portion of the heating cylinder is inserted, a passage 113 is formed in the jacket 111 for passing a temperature control medium therethrough, and a communication port 115. The conventional passage often has a complex route for the purpose of temperature control, and it is therefore necessary to cut machining holes for forming the passage. Since such machining holes are unnecessary for actual operation of the passage, a large number of plugs 114 are used to close the holes. Accordingly, foreign matter is liable to be deposited inside the passage, and the removal of the deposited matter requires prolonged maintenance work, often necessitating detachment of the heating cylinder.

SUMMARY OF THE INVENTION

An object of the present invention is to improve maintainability and reduce a manufacturing cost of a temperature control device of a proximal portion of a heating cylinder of an injection molding machine. Another object of the present invention is to make it easy to check and control the flow rate of a temperature control medium.

A temperature control device of the present invention introduces improvements in an attaching structure of the device to the proximal portion of the heating cylinder and an arrangement of a passage of heat medium so as to enhance the maintainability and reduce the manufacturing cost. Further, a flow-rate control mechanism and a flow-rate detecting mechanism are arranged such that an operator can check and control the flow rate at a location where an ordinary operation of an injection molding machine is performed, thereby the flow rate of the heat medium can be checked and controlled with ease.

A temperature control device for a heating cylinder of an injection molding machine according to the present invention comprises a jacket to be attached to a proximal portion of the heating cylinder of the injection molding machine. The jacket has at least one pair of through holes for flowing heat medium for temperature control. These through holes are connected by pipes so that a passage for the heat medium is formed by the through holes and the pipes. A flow-rate control mechanism for controlling flow rate of the heat medium flowing in the passage and a flow-rate detection mechanism for detecting flow rate of heat medium are arranged in the passage formed by the pipes.

The passage for the heat medium in the jacket is formed by simple through holes, and thus can be formed by a simple machining operation. Also, since the passage is formed by through holes, deposit adhered to the inner surface of the passage can be easily removed without detaching the jacket from the proximal portion of the heating cylinder, whereby maintainability can be improved.

The flow-rate control mechanism may comprise a control valve arranged in the passage and a control knob for varying the opening of the control valve. The opening of the control valve is varied by means of the control knob to vary the diameter of the passage, whereby the flow rate of the temperature control medium flowing in the passage is controlled. The flow-rate detection mechanism may comprise a floating member urged by a spring arranged inside the passage and an indicator interlocking with movement of the floating member to visually indicate the flow rate of the heat medium flowing in the passage. The flow-rate control mechanism and the flow-rate detection mechanism may be formed integrally to have a single body or separately to have separate bodies.

Neither the flow-rate control mechanism nor the flow-rate detection mechanism requires an electromagnetic valve, a controller for actuating the electromagnetic valve and a sensor, so that the manufacturing cost can be reduced. In the case where high-accuracy temperature control is required, an electromagnetic valve may be used in combination to finely control the flow rate of the heat medium.

The flow-rate control mechanism and the flow-rate detection mechanism are arranged near the jacket to make it easy to attach these mechanisms to the jacket and thereby pipes connecting these mechanisms can be shortened to facilitate piping work.

The through holes in the jacket are arranged to extend from one side of the jacket on which an operation panel of the injection molding machine is positioned to the opposite side of the jacket. The flow-rate control mechanism and the flow-rate detection mechanism are connected, by pipes, to openings of the through holes which open on the side of the jacket on which the operation panel is located, whereby these mechanisms are situated on the same side as the operation panel of the injection molding machine.

With the above arrangement, an operator can control and confirm the flow rate at a location where the operator performs an ordinary operation of the injection molding machine on the operation panel.

A pipe for supplying the heat medium to the passage and a pipe for discharging the medium from the passage are attached to the other openings of the through holes on the jacket on the other side opposite to the side where the operation panel of the injection molding machine is located. Thus, all openings of the through holes are used for the attachment of the flow-rate control and detection mechanisms and the supply and discharge pipes, to eliminate the use of plugs.

The flow-rate control mechanism, the flow-rate detection mechanism, the supply pipe and the discharge pipe can be easily attached and detached through, for example, a flange or screw mechanism, without the need to detach the heating cylinder etc. Further, the present invention does not require the use of special piping or devices for mounting the flow-rate control mechanism or flow-rate detection mechanism on the same side as the operation panel, or the use of fixing parts such as metal plates, whereby the assemblage of the injection molding machine is simplified and the number of parts is reduced, thereby reducing the cost.

Further, the jacket for temperature control can be manufactured by simple machining operation of forming a hole for inserting the heating cylinder, through holes for passing the heat medium and a communication port for introducing resin in one workpiece. Also, the temperature control can be performed without the need to narrow the passage in the jacket, whereby clogging of the passage and thus frequency of maintenance can be reduced.

The heat medium for temperature control is introduced from the supply pipe into the passage in the jacket from the side of the injection molding machine opposite to the side where the operation panel is located, and after heat exchange is performed in the passage, the medium is introduced to the flow-rate control mechanism and the flow-rate detection mechanism arranged on the side of the injection molding machine where the operation panel is located. An operator can check and control the flow rate of the heat medium by means of the flow-rate detection mechanism and the flow-rate control mechanism. Then, the heat medium is again introduced into the passage in the jacket from the side where the operation panel is located, and after the heat exchange in the passage the medium is discharged through the discharge pipe from the side opposite to the operation panel. In the jacket, supply and discharge passages can be formed for the flow-rate control and detection mechanisms by a pair of through holes, and one pair or a plurality of pairs of through holes may be provided for these passages.

DETAILED DESCRIPTION OF THE PREFERRED EMBODIMENTS

Figure 1:
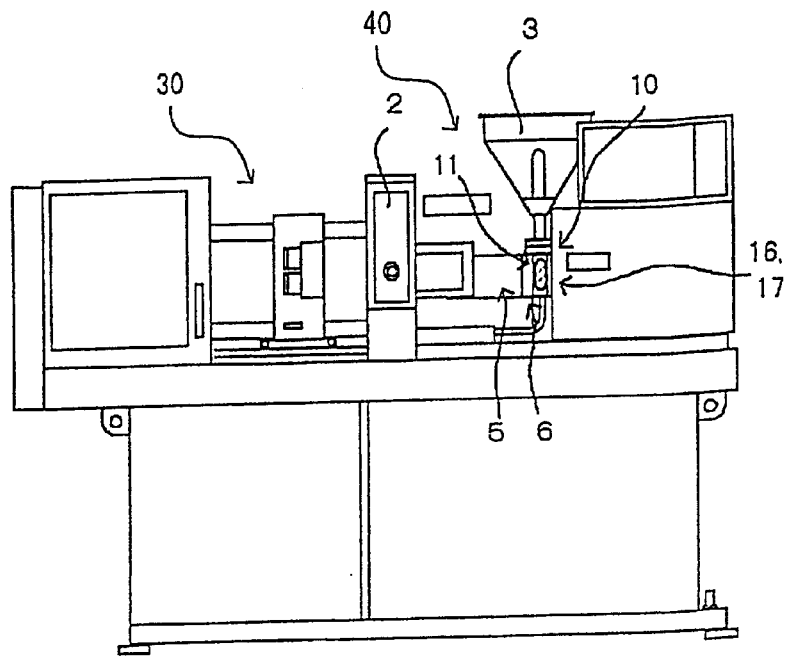
FIG. 1 is a front view of a temperature control device for a proximal portion of a heating cylinder according to the present invention, and an injection molding machine to which the temperature control device is applied, as viewed form an operation panel side.
Figure 2:
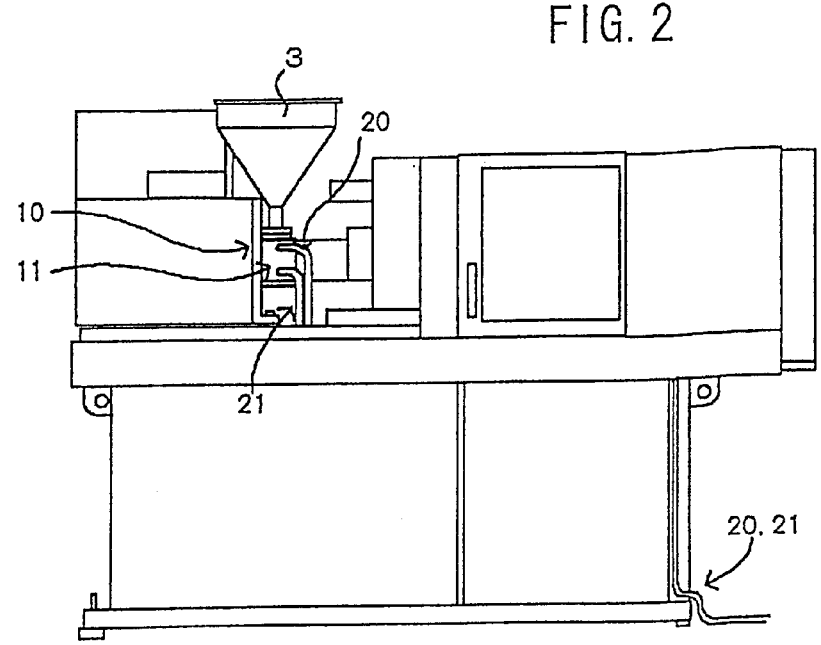
FIG. 2 is a rear view of the temperature control device and the injection molding machine to which the temperature control device is applied, as viewed form the side opposite to the operation panel side.

FIGS. 1 and 2 are front views illustrating a temperature control device for controlling temperature of a proximal portion of a heating cylinder according to the present invention and an injection molding machine to which the temperature control device is applied, wherein FIG. 1 shows an operation panel side and FIG. 2 shows a side opposite the operation panel. The injection molding machine schematically shown in FIGS. 1 and 2 has a construction generally known in the art, and therefore detailed description thereof is omitted here.

In FIGS. 1 and 2, an injection molding machine 1 has, like a conventional injection molding machine, a mold clamping mechanism 30, an injection mechanism 40 and an operation panel 2, all arranged on a frame, and performs injection molding by clamping a mold between stationary and movable plates constituting the mold clamping mechanism 30, sliding the injection mechanism 40 to press a nozzle at a distal end of a heating cylinder 5 into a center hole in the stationary plate, and injecting resin, which is supplied from a hopper 3 through a proximal portion 6 and a body portion of the heating cylinder 5, from the nozzle into a cavity defined between mold halves. An ordinary operation is performed on one side of the injection molding machine 1 on which the operation panel 2 is arranged as illustrated in FIG. 1. In FIG. 1, the proximal portion 6 and the heating cylinder 5 indicate their respective locations in the machine.

A temperature control device 10 for controlling temperature of the proximal portion of the heating cylinder according to the present invention is arranged in the vicinity of the proximal portion 6 of the heating cylinder. In FIG. 1, a jacket 11, a flow-rate control mechanism 16 and a flow-rate detection mechanism 17 constituting the temperature control device 10 are illustrated only schematically. Operation associated with the flow rate control and detection by means of the temperature control device 10 can therefore be performed on the same side as the operation panel 2 of the injection molding machine 1.

FIG. 2 shows another side of the machine opposite the operation panel, and as illustrated, pipes 20 and 21 for supplying and discharging a temperature control medium are attached to the side of the jacket 11 opposite the operation panel. The pipes 20 and 21 extend from the injection molding machine 1 and are connected to a main tap of the temperature control medium.

Figure 3:
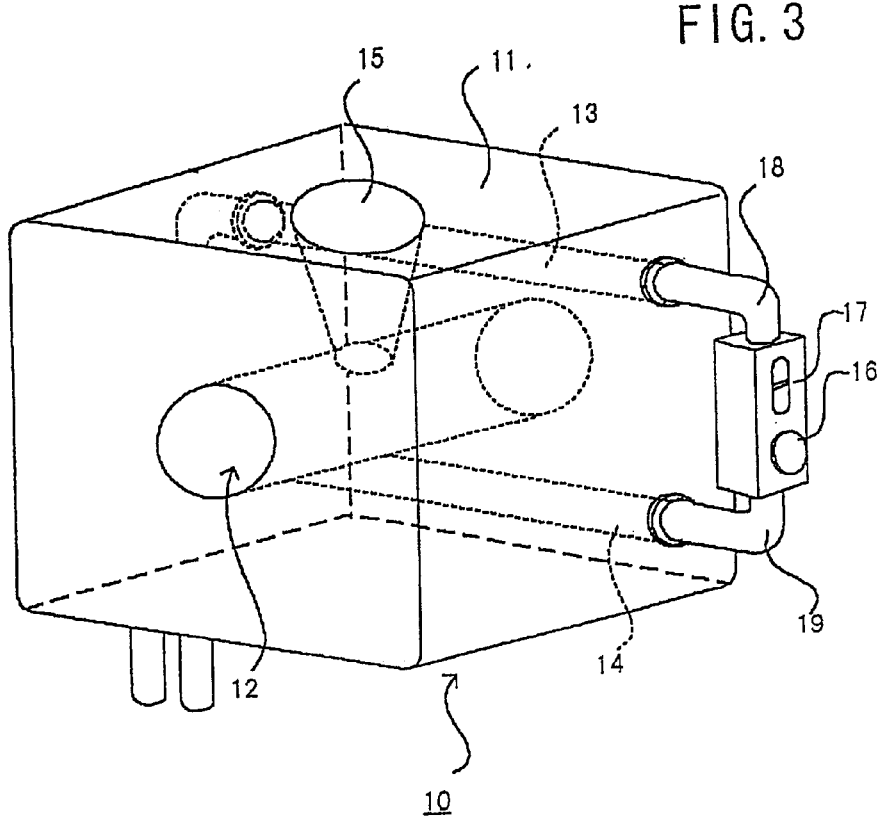
FIG. 3 is a schematic perspective view of the temperature control device according to the present invention with flow-rate control and detection mechanisms attached.
Figure 4:
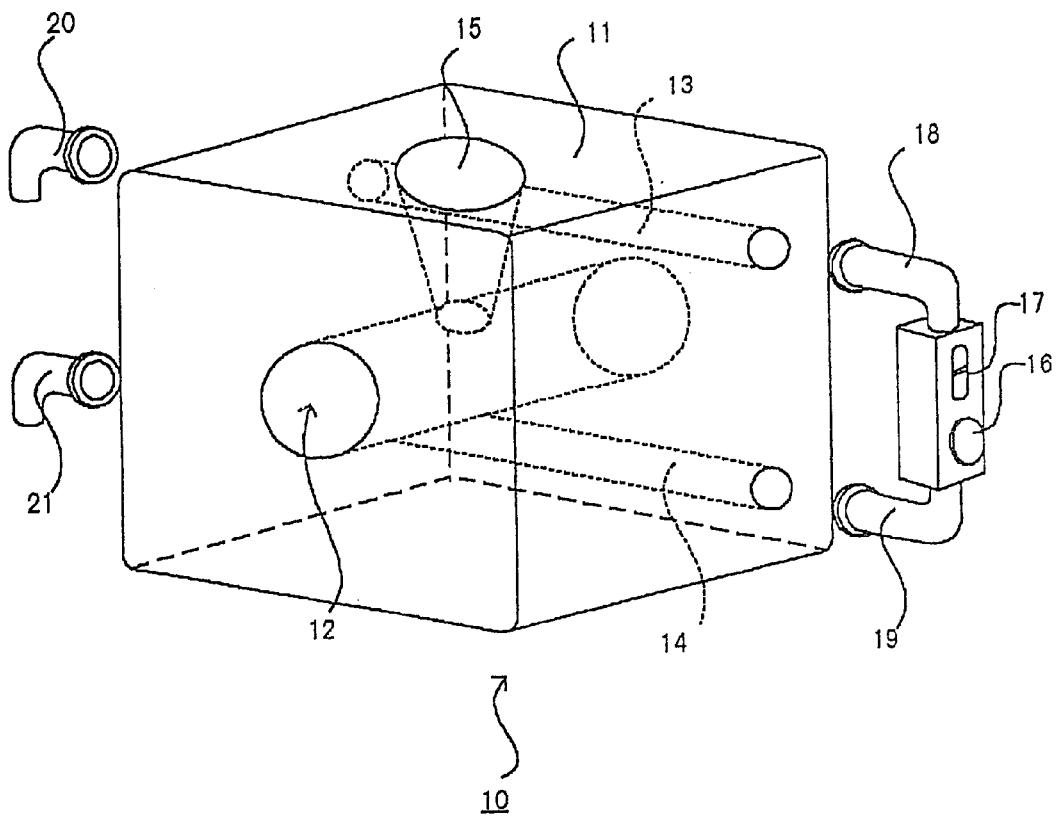
FIG. 4 is a schematic perspective view of the temperature control device according to the present invention with the flow-rate control and detection mechanisms detached.
Figure 5:
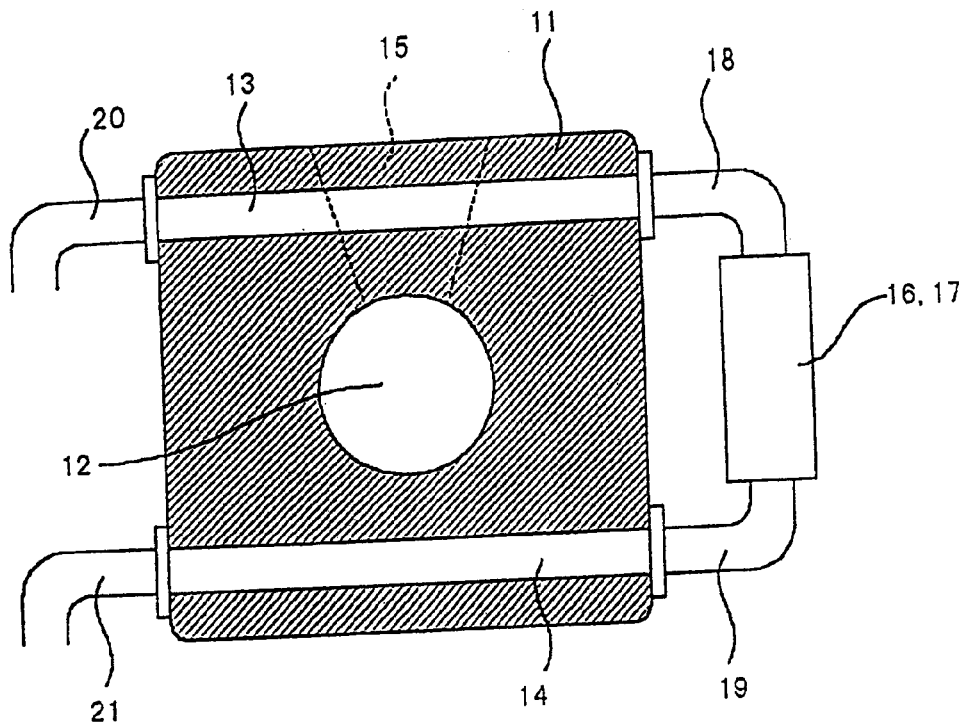
FIG. 5 is a sectional view of the temperature control device according to the present invention with the flow-rate control and detection mechanisms attached.
Figure 6:
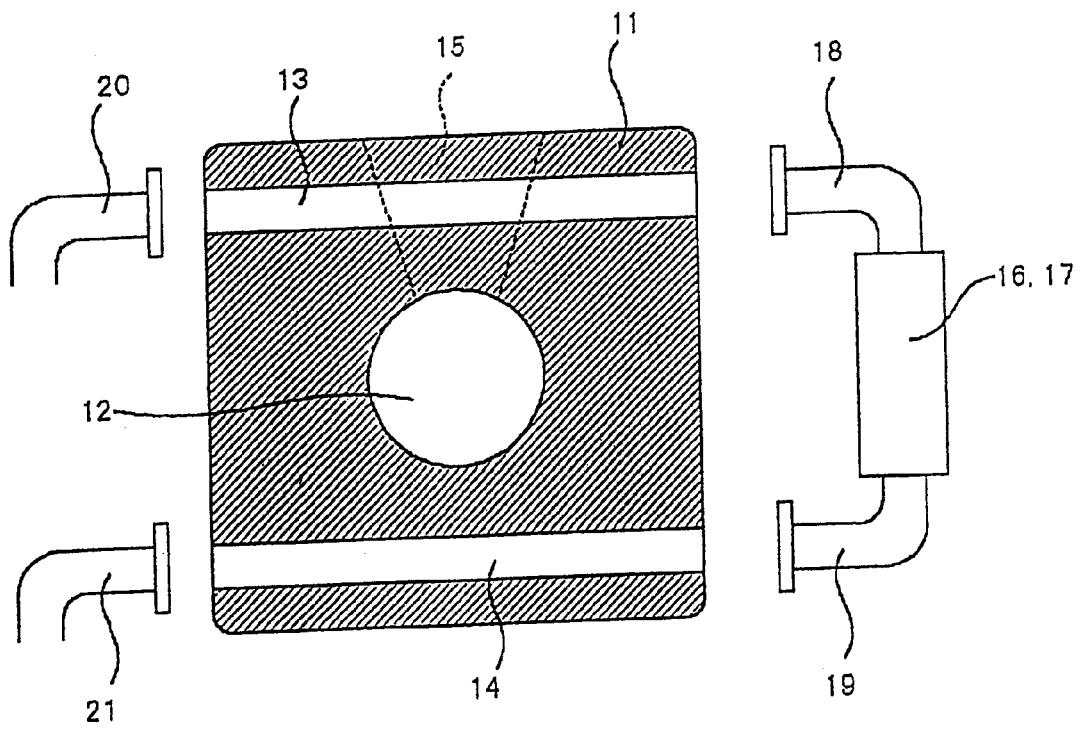
FIG. 6 is a sectional view of the temperature control device according to the present invention with the flow-rate control and detection mechanisms detached.

Referring now to FIGS. 3 to 6, the arrangement of the temperature control device 10 will be described. FIGS. 3 and 4 are schematic perspective views of the temperature control device 10, and FIGS. 5 and 6 are sectional views of the temperature control device 10. Also, FIGS. 3 and 5 illustrate a state in which the flow-rate control mechanism 16 and the flow-rate detection mechanism 17 are attached, and FIGS. 4 and 6 illustrate a state in which the mechanisms 16 and 17 are detached.

As shown in FIGS. 3 and 4, the temperature control device 10 comprises the jacket 11, the flow-rate control mechanism 16 and the flow-rate detection mechanism 17.

The jacket 11 has openings and passages formed therein, namely, an attachment through hole 12 into which the proximal portion of the heating cylinder, not shown, is fitted, for attachment of the jacket to the heating cylinder, passages 13 and 14 for passing the heat medium therethrough, and a communication port 15 through which resin is introduced into the heating cylinder fitted in the attachment hole 12.

The attachment hole 12 has a diameter substantially equal to the outer diameter of the proximal portion of the heating cylinder, and the jacket is attached to the heating cylinder by fitting the proximal portion of the heating cylinder into the attachment hole with their axes aligned with each other.

The passages 13 and 14 are formed so as to extend between the side of the jacket on which the operation panel is situated and the opposite side, in the state where the temperature control device 10 is attached to the heating cylinder. One of the two passages serves as a supply passage for introducing the temperature control medium into the jacket 11, and the other serves as a discharge passage for discharging the temperature control medium from the jacket 10.

In the arrangement shown in FIGS. 3 and 4, the passages 13 and 14 comprise a pair of through holes extending above and below the attachment hole 12, respectively. However, the positions of these passages with respect to the attachment hole 12, the number of pairs of through holes to be formed with respect to the hole 12, and which hole is to be used as the supply or discharge passage may be determined as desired. Also, the angle of the passages 13 and 14 with respect to the attachment hole 12 may be set as desired, on condition that the passages penetrate through the jacket from the same side as the operation panel to the opposite side.

The flow-rate control mechanism 16 and the flow-rate detection mechanism 17 are attached to operation panel-side openings of the through holes 13 and 14 formed through the jacket 11, and constitute a single continuous passage together with the passages 13 and 14. The mechanisms are attached to the openings of the jacket 11 via pipes 18 and 19, and a flange or screw mechanism or any other suitable means may be used for connection. FIG. 3 illustrates a state in which the flow-rate control mechanism 16 and the flow-rate detection mechanism 17 are attached, and FIG. 4 illustrates a state in which the mechanisms 16 and 17 are detached.

The pipes 20 and 21, which serve as the supply and discharge pipes, are attached to opposite-side openings of the through holes 13 and 14 formed in the jacket 11, that is, on the side of the jacket opposite the operation panel. These pipes may be attached to the openings of the jacket 11 by a flange or screw mechanism or any other suitable means.

The flow-rate control mechanism 16 and the flow-rate detection mechanism 17 may be arranged at any desired location of a channel constituted by the passages 13 and 14 insofar as they are situated on the operation panel side, and may be formed integrally to have a single or separately to have separate bodies. FIGS. 3 and 4 illustrate a case where the two mechanisms are integrated into one body.

The flow-rate control mechanism 16 controls the flow rate of the temperature control medium flowing through the passages 13 and 14 in the temperature control device 10. The mechanism 16, which may have a generally known arrangement, comprises a control valve arranged in the passage, a control knob for varying the opening of the control valve. The opening of the control valve is varied by means of the control knob to change the diameter of the passage, whereby the flow rate of the temperature control medium flowing through the passage is controlled.

The flow-rate detection mechanism 17 detects the flow rate of the temperature control medium flowing through the passages 13 and 14 in the temperature control device 10. The mechanism 17, which also may have a generally known arrangement, comprises a floating member urged by a spring arranged inside the passage, and an indicator interlocking with movement of the floating member and visible from outside. The floating member (and the indicator member) stops at a position where the flow rate of the temperature control medium flowing in the passage is equilibrated with a reaction force of the urging member. The equilibrated position of the indicator member is viewed from outside, to observe and confirm the flow rate of the temperature control medium.

FIGS. 5 and 6 are sectional views of the device shown in FIGS. 3 and 4, respectively, taken at a position where the flow-rate control mechanism and the flow-rate detection mechanism are situated. The temperature control device is installed by first fitting only the jacket 11 on the proximal portion of the heating cylinder, as shown in FIG. 6, and then attaching the flow-rate control and detection mechanisms 16 and 17, and the pipes 20 and 21 to the jacket, as shown in FIG. 5. Consequently, a single continuous passage is formed by the pipe 20, the through hole 13, the pipe 18, the flow-rate control and detection mechanisms 16 and 17, the through hole 14 and the pipe 21. As the temperature control medium flows through the passage, it exchanges heat with the proximal portion of the heating cylinder (not shown) fitted into the attachment hole 12, to thereby control the temperature of the resin.

Figure 7:
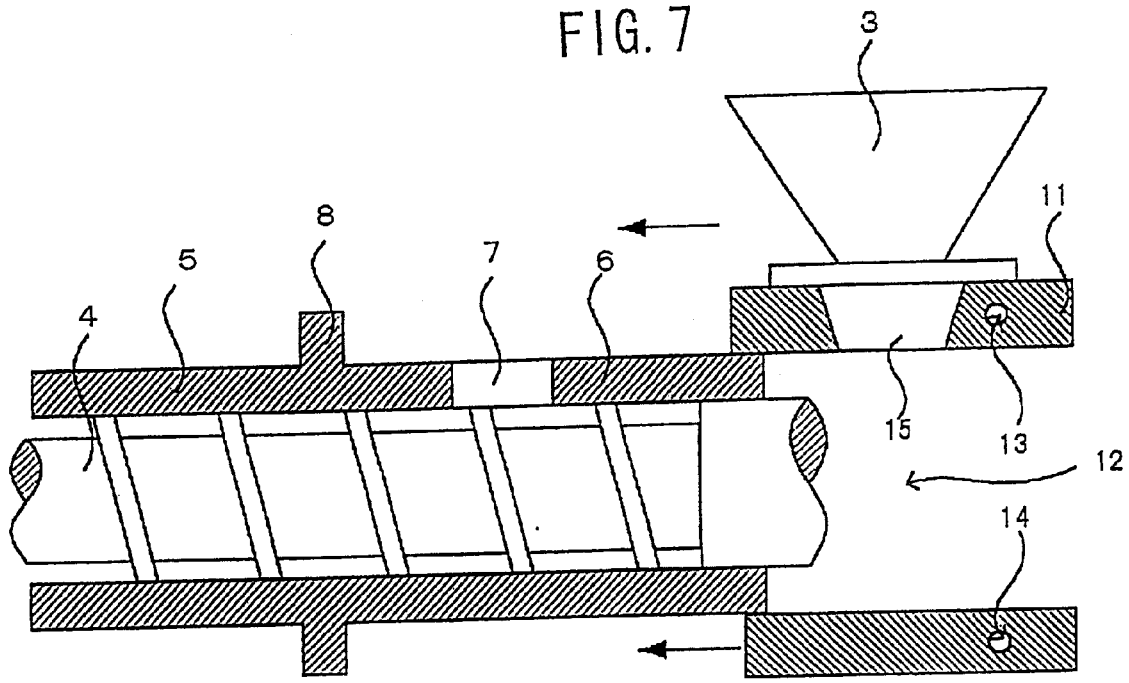
FIG. 7 is a sectional view illustrating how the jacket according to the present invention is attached by fitting on the proximal portion of the heating cylinder.

Referring now to the sectional views of FIGS. 7 and 8, how the jacket 11 is attached on the proximal portion 6 of the heating cylinder 5 will be described. FIG. 7 shows a state in which the jacket is being attached to or detached from the heating cylinder, and FIG. 8 shows a state in which the jacket is completely fitted on the cylinder.

Figure 8:
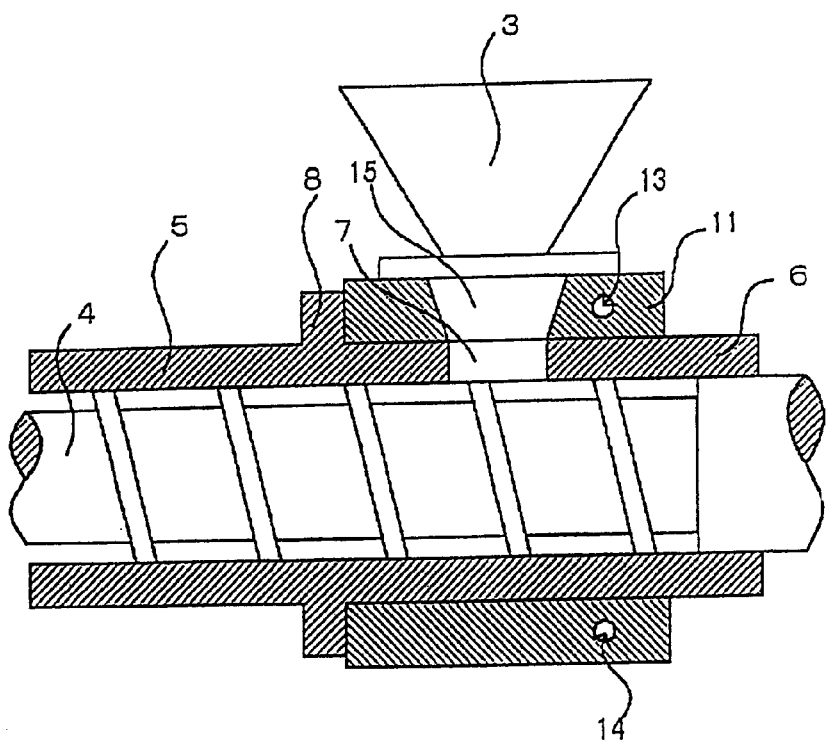
FIG. 8 is a sectional view illustrating the jacket and the heating cylinder in a state in which the jacket is completely fitted on the proximal portion of the cylinder.

As shown in FIGS. 7 and 8, the heating cylinder 5 has an injection screw 4 inserted through an internal space thereof. The injection screw 4 projects from the proximal portion 6 of the heating cylinder 5 and is connected to a screw pusher plate of an injection unit via a screw rotation mechanism, not shown. The injection screw 4 rotates as it is driven by the screw rotation mechanism, and also moves in a direction of an injection axis as the screw pusher plate, which is driven along the injection axis by an injection mechanism fixed to the injection unit, moves forward and backward. A resin inlet port 7 is cut in a part of the proximal portion 6 corresponding in position to the communication port 15 formed in the jacket 11, and also a radially protruding flange 8 is formed on part of the heating cylinder.

The jacket 11 of the temperature control device 10 is attached to the proximal portion 6 of the heating cylinder 5 by fitting the proximal portion 6 into the attachment hole 12 formed in the jacket 11 and pushing the jacket 11 in the axial direction of the heating cylinder 5. The attaching position of the jacket 11 with respect to the heating cylinder 5 is determined as soon as the end of the jacket 11 abuts against the flange 8 of the heating cylinder 5. In this case, the position of the communication port 15 cut in the jacket 11 and the position of the resin inlet port 7 in the proximal portion 6 are set in advance such that the communication port 15 is aligned with the resin inlet port 7. To permit the communication port 15 to be radially aligned with the resin inlet port 7, a recess and a protuberance (not shown) capable of engagement with each other may be formed in corresponding portions of the proximal portion 6 and the jacket 11.

Thus, the temperature control device 10 can be installed on the heating cylinder by simply fitting the jacket 11 on the proximal portion 6 of the heating cylinder. Also, the temperature control device can be detached from the heating cylinder by simply pulling out the jacket 11.

Figure 9:
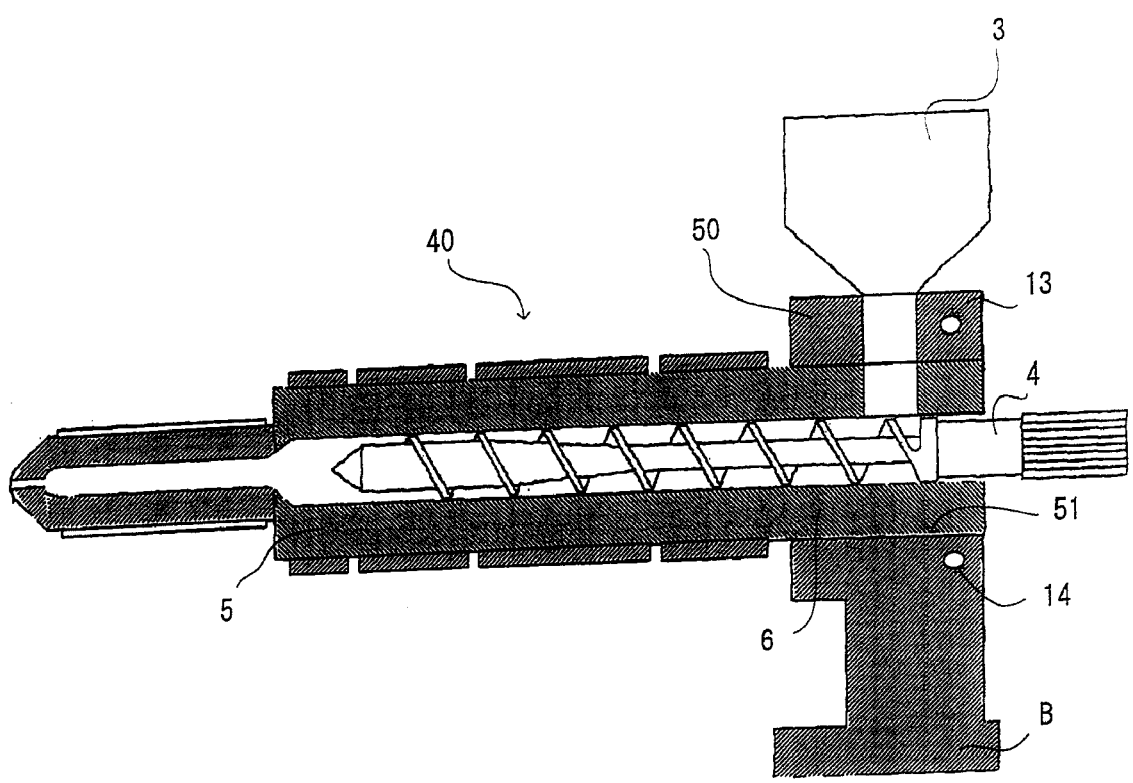
FIG. 9 is a sectional view illustrating attachment of the jacket to the proximal portion of the heating cylinder in the case where the jacket is formed integrally with a base of the injection mechanism.

Further, the jacket for temperature control may be formed integrally with a base of the injection mechanism. In this case, as shown in FIG. 9, a jacket 50 formed integrally with a base B of the injection mechanism 40 is attached to the proximal portion 6 of the heating cylinder 5 by fitting the proximal portion 6 into an attachment hole 51 formed in the jacket 50 and pushing the jacket 50 in the axial direction of the heating cylinder 5.

Figure 10:
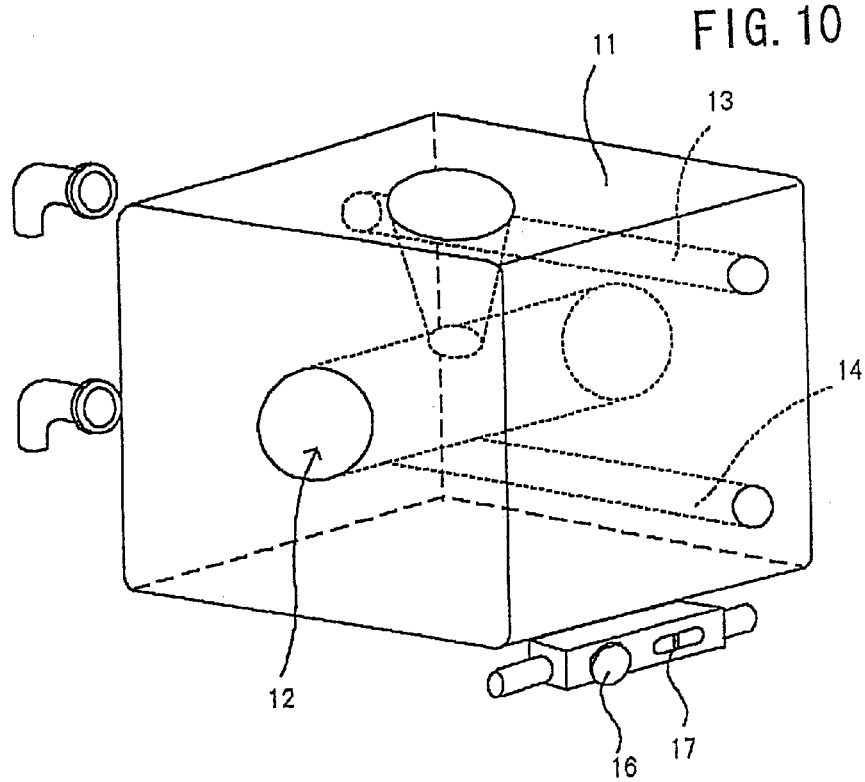
FIG. 10 is a schematic diagram for showing a different arrangement of the flow-rate control and detection mechanisms of the temperature control device according to the present invention.
Figure 11:
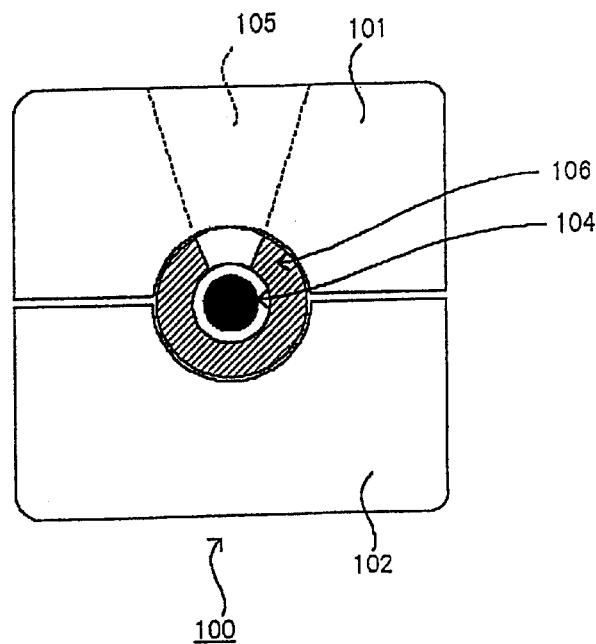
FIG. 11 is a diagram illustrating a conventional temperature control device having a two-upper/lower-piece structure.
Figure 12:
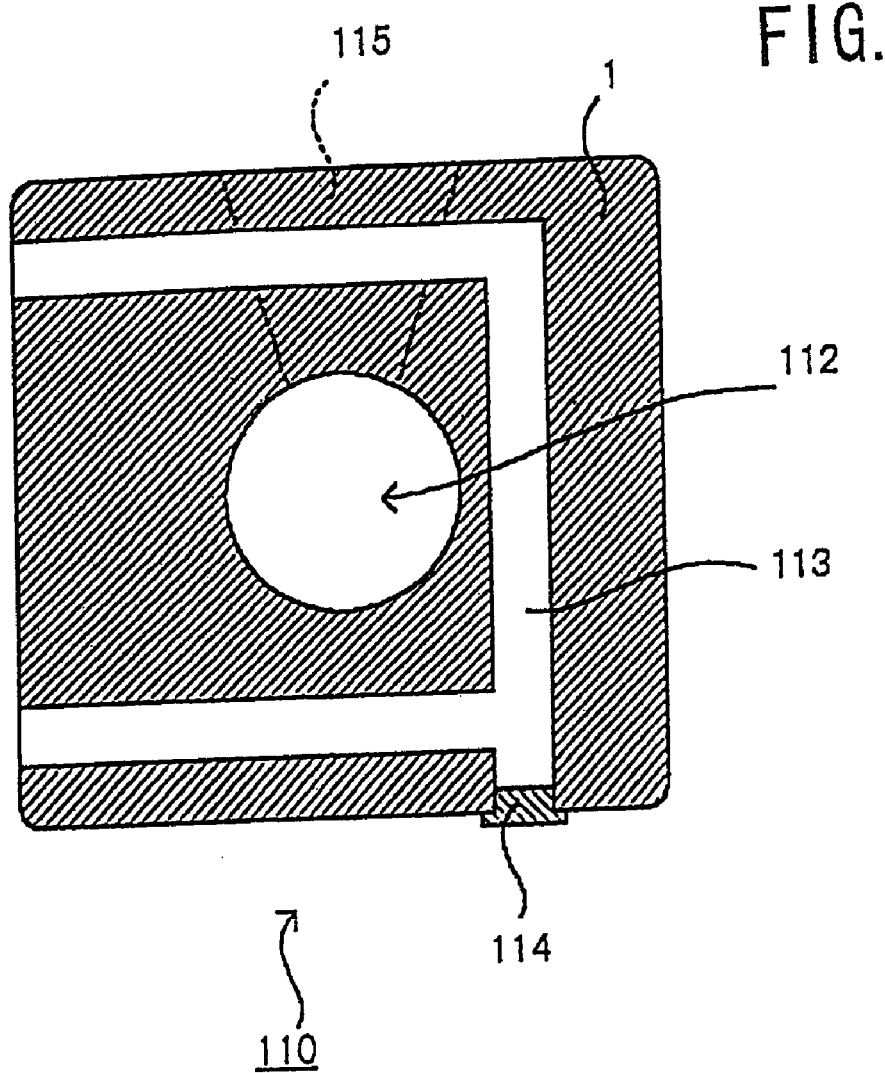
FIG. 12 is a sectional view illustrating an arrangement of another conventional temperature control device.

FIG. 10 illustrates the flow-rate control and detection mechanisms 16 and 17 arranged at a different position. In FIG. 10, pipes for connecting the flow-rate control and detection mechanisms with the jacket are omitted.

The flow-rate control mechanism 16 and the flow-rate detection mechanism 17 may be situated at any desired location on the operation panel side insofar as they are arranged in the continuous passage constituted by the through holes 13 and 14. FIG. 10 shows a case where the flow-rate control and detection mechanisms 16 and 17 are arranged on the operation panel side below or at a lower level than the jacket 11. Since the flow-rate control and detection mechanisms 16 and 17 are arranged on the same side as the operation panel, the flow rate of the temperature control medium can be controlled and checked at the same position where the operation panel of the injection molding machine is operated.

As described above, according to the present invention, the temperature control device for controlling temperature of a proximal portion of a heating cylinder of an injection molding machine makes it easy to check and control the flow rate of the temperature control medium. Also, the temperature control device capable of controlling the flow rate of the heat medium can be improved in maintainability and reduced in cost.

What is claimed is:

1. A temperature control device for a heating cylinder of an injection molding machine, comprising:
   a jacket to be attached to a proximal portion of said heating cylinder, having at least one pair of through holes for flowing heat medium for temperature control;

pipes connecting said at least one pair of through holes to form a passage for the heat medium with said through holes; and a flow-rate control mechanism and a flow-rate detection mechanism arranged in said passage formed by said pipes, for the heat medium flowing in said passage.

2. A temperature control device for a heating cylinder of an injection molding machine according to claim 1, wherein said injection molding machine has an operation panel, and said through holes are formed between one side of said jacket on which said operation panel of the injection molding machine is positioned and the opposite side of said jacket, and said flow-rate control mechanism and said flow-rate detection mechanism are located on said one side of said jacket.

3. A temperature control device for a heating cylinder of an injection molding machine according to claim 1, wherein said flow-rate control mechanism and said flow-rate detection mechanism are provided integrally.

4. A temperature control device for a heating cylinder of an injection molding machine according to claim 1, wherein said flow-rate control mechanism and said flow-rate detection mechanism are located at a lower level than said jacket.

5. A temperature control device for a heating cylinder of an injection molding machine according to claim 1, wherein said flow-rate detection mechanism has an indicator for visually indicating the flow rate of the heat medium.

* * * * *